United States Patent
Yanus et al.

Patent Number: 6,103,436
Date of Patent: Aug. 15, 2000

[54] OVERCOATED PHOTORECEPTORS AND METHODS OF USING OVERCOATED PHOTORECEPTORS

[75] Inventors: John F. Yanus, Webster; Damodar M. Pai, Fairport; Timothy J. Fuller, Pittsford; Paul J. DeFeo, Sodus Point; Anthony T. Ward; Dale S. Renfer, both of Webster; William W. Limburg, Penfield; Markus R. Silvestri, Fairport; Harold F. Hammond, Webster; Robert W. Nolley, Rochester, all of N.Y.

[73] Assignee: Xerox Corporation, Stamford, Conn.

[21] Appl. No.: 09/182,602

[22] Filed: Oct. 29, 1998

[51] Int. Cl.⁷ .................................................. G03G 5/047
[52] U.S. Cl. ...................... 430/58.8; 430/58.75; 430/66; 430/97
[58] Field of Search .............................. 430/59.6, 58.75, 430/58.8, 66, 97

[56] References Cited

U.S. PATENT DOCUMENTS

| | | | |
|---|---|---|---|
| 4,871,634 | 10/1989 | Limburg et al. | 430/54 |
| 4,999,268 | 3/1991 | Ojima et al. | 430/58.8 |
| 5,368,967 | 11/1994 | Schank et al. | 430/59 |
| 5,529,868 | 6/1996 | Mashimo et al. | 430/58.8 |
| 5,612,157 | 3/1997 | Yuh et al. | 430/58 |
| 5,670,291 | 9/1997 | Ward et al. | 430/132 |
| 5,681,679 | 10/1997 | Schank et al. | 430/59 |
| 5,702,854 | 12/1997 | Schank et al. | 430/59 |
| 5,709,974 | 1/1998 | Yuh et al. | 430/59 |

*Primary Examiner*—Christopher D. Rodee

[57] ABSTRACT

An electrophotographic imaging member including a supporting substrate coated with at least photoconductive layer, a charge transport layer and an overcoating layer, the overcoating layer including
a hydroxy functionalized aromatic diamine and
a hydroxy functionalized triarylamine dissolved or molecularly dispersed in
a crosslinked polyamide matrix, the crosslinked polyamide prior to crosslinking being selected from the group consisting of materials represented by the following Formulae I and II:

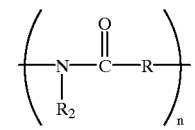

I wherein:
n is a positive integer sufficient to achieve a weight average molecular weight between about 5000 and about 100,000,
R is an alkylene unit containing from 1 to 10 carbon atoms,
between 1 and 99 percent of the $R_2$ sites are —H, and
the remainder of the $R_2$ sites are —$CH_2$—O—$CH_3$, and

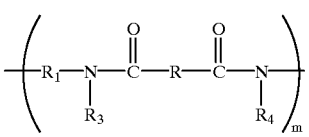

II wherein:
m is a positive integer sufficient to achieve a weight average molecular weight between about 5000 and about 100000,
$R_1$ and R are independently selected from the group consisting of alkylene units containing from 1 to 10 carbon atoms, and
between 1 and 99 percent of the $R_3$ and $R_4$ sites are —H, and
the remainder of the $R_3$ and $R_4$ sites are —$CH_2$—O—$CH_3$.

Coating compositions for the overcoating layer of this invention as well as methods of making and using the overcoated photoreceptor are also disclosed.

18 Claims, No Drawings

OVERCOATED PHOTORECEPTORS AND METHODS OF USING OVERCOATED PHOTORECEPTORS

BACKGROUND OF THE INVENTION

This invention relates in general to overcoated electrophotographic imaging members and more specifically, to overcoating compositions, overcoated electrophotographic imaging members and methods of fabricating and using the overcoated electrophotographic imaging members.

Electrophotographic imaging members, i.e., photoreceptors, typically include a photoconductive layer formed on an electrically conductive substrate. The photoconductive layer is a good insulator in the dark so that electric charges are retained on its surface. Upon exposure to light, the charge is dissipated in the exposed regions.

An electrostatic latent image is formed on the photoreceptor by first uniformly depositing an electric charge over the surface of the photoconductive layer by one of any suitable means well known in the art. The photoconductive layer functions as a charge storage capacitor with charge on its free surface and an equal charge of opposite polarity (the counter charge) on the conductive substrate. A light image is then projected onto the photoconductive layer. On those portions of the photoconductive layer that are exposed to light, the electric charge is conducted through the layer reducing the surface charge. The portions of the surface of the photoconductive not exposed to light retain their surface charge. The quantity of electric charge at any particular area of the photoconductive surface is inversely related to the illumination incident thereon, thus forming an electrostatic latent image. After development of the latent image with toner particles to form a toner image, the toner image is usually transferred to a receiving member such as paper. Transfer is effected by various means such as, for example, by electrostatic transfer during which an electrostatic charge is applied to the back side of the receiving member while the front side of the member is in contact with the toner image.

The photodischarge of the photoconductive layer requires that the layer photogenerate free charge carriers and transport this charge through the layer thereby neutralizing the charge on the surface. Two types of photoreceptor structures have been employed: One type comprises multilayer structures wherein separate layers perform the functions of charge generation and charge transport, respectively. The other type comprises single layer photoconductors which perform both functions. These layers are formed on an electrically conductive substrate and may include an optional charge blocking and an adhesive layer between the conductive layer and the photoconducting layer or layers. Additionally, the substrate may comprise a non-conducting mechanical support with a conductive surface. Other layers for providing special functions such as incoherent reflection of laser light, dot patterns for pictorial imaging or subbing layers to provide chemical settings and/or a smooth coating surface may optionally be employed.

One common type of photoreceptor is a multilayered device that comprises a conductive layer, a blocking layer, an adhesive layer, a charge generating layer, and a charge transport layer. The charge transport layer can contain an active aromatic diamine molecule, which enables charge transport, dissolved or molecularly dispersed in a film forming binder. This type of charge transport layer is described, for example in U.S. Pat. No. 4,265,990. Other charge transport molecules disclosed in the prior art include a variety of electron donor, aromatic amines, oxadiazoles, oxazoles, hydrazones and stilbenes for hole transport and electron acceptor molecules for electron transport. Another type of charge transport layer has been developed which utilizes a charge transporting polymer wherein the charge transporting moiety is incorporated in the polymer as a group pendant from the backbone of the polymer backbone or as a moiety in the backbone of the polymer. These types of charge transport polymers include materials such as poly(N-vinylcarbazole), polysilylenes, and others including those described, for example, in U.S. Pat. Nos. 4,618,551, 4,806,443, 4,806,444, 4,818,650, 4,935,487, and 4,956,440. The disclosures of these patents are incorporated herein in their entirety.

Charge generator layers comprise amorphous films of selenium and alloys of selenium and arsenic, tellurium, germanium and the like, hydrogenated amorphous silicon and compounds of silicon and germanium, carbon, oxygen, nitrogen and the like fabricated by vacuum evaporation or other suitable techniques for deposition. The charge generator layers may also comprise inorganic pigments of crystalline selenium and its alloys; Group II–VI compounds; and organic pigments such as quinacridones, polycyclic pigments such as dibromo anthanthrone pigments, perylene and perinone diamines, polynuclear aromatic quinones, azo pigments including bis-, tris- and tetrakis-azos; and the like dispersed in a film forming polymeric binder and fabricated by solvent coating techniques.

Phthalocyanines have been employed as photogenerating materials for use in laser printers utilizing infrared exposure systems. Infrared sensitivity is required for photoreceptors exposed to low cost semiconductor laser diode light exposure devices. The absorption spectrum and photosensitivity of the phthalocyanines depend on the central metal atom of the compound. Many metal phthalocyanines have been reported and include, for example, oxyvanadium phthalocyanine, chloroaluminum phthalocyanine, copper phthalocyanine, oxytitanium phthalocyanine, chlorogallium phthalocyanine, magnesium phthalocyanine and metal-free phthalocyanine. The phthalocyanines exist in many crystal forms which have a strong influence on photogeneration.

One design criteria for the selection of the photosensitive pigment for a charge generator layer and the charge transporting molecule for a transport layer is that, when light photons photogenerate holes in the pigment, the holes be efficiently injected into the charge transporting molecule in the transport layer. More specifically, the injection efficiency from the pigment to the transport layer should be high. A second design criterion is that the injected holes be transported across the charge transport layer in a short time; shorter than the time duration between the exposure and development stations in an imaging device. The transit time across the transport layer is determined by the charge carrier mobility in the transport layer. The charge carrier mobility is the velocity per unit field and has dimensions of $cm^2$/volt sec. The charge carrier mobility is a function of structure of the charge transporting molecule, the concentration of the charge transporting molecule in the transport layer and the electrically "inactive" binder polymer in which the charge transport molecule is dispersed.

Reprographic machines often utilize multilayered organic photoconductors and can also employ corotrons, scorotrons or bias charging rolls to charge the photoconductors prior to imagewise exposure. Further, corotrons, scorotrons or bias transfer rolls may be utilized to transfer toner images from a photoreceptor to a receiving member. Bias transfer rolls for charging purposes have the advantage that they generally emit less ozone than corotrons and scorotrons. It has been found that as the speed and number of imaging of copiers, duplicators and printers are increased, bias transfer rolls and bias charge rolls can cause serious wear problems to the photoreceptors. Bias transfer rolls and bias charge rolls are known in the art. Bias transfer rolls, which are similar to bias charge rolls, are described, for example in U.S. Pat. No. 5,420,677, U.S. Pat. No. 5,321,476 and U.S. Pat. No. 5,303,014. The entire disclosures of these patents are incorporated herein by reference. As a consequence of the abrasive action of the bias transfer rolls and bias charge rolls, the operating lifetime of conventional photoreceptors is severely reduced. In a test conducted on a normally abrasion resistant non-crosslinked overcoated photoreceptor composition, introduction of bias transfer roll and bias charge roll subsystems cause a greater than eight fold increase in wear of the overcoated photoreceptor. The precise nature of the electrical/abrasive wearing away of the charge transport layer thickness is unknown, but it is theorized that some degradative process involving charge scission of the binder occurs, or in the case of arylamine hole transporting polymers, a reduction in chain lengths causes the polymers to lose their inherent strength.

As described above, one type of multilayered photoreceptor that has been employed as a belt in electrophotographic imaging systems comprises a substrate, a conductive layer, a charge blocking layer a charge generating layer, and a charge transport layer. The charge transport layer often comprises an activating small molecule dispersed or dissolved in a polymeric film forming binder. Generally, the polymeric film forming binder in the transport layer is electrically inactive by itself and becomes electrically active when it contains the activating molecule. The expression "electrically active" means that the material is capable of supporting the injection of photogenerated charge carriers from the material in the charge generating layer and is capable of allowing the transport of these charge carriers through the electrically active layer in order to discharge a surface charge on the active layer. The multilayered type of photoreceptor may also comprise additional layers such as an anticurl backing layer, an adhesive layer, and an overcoating layer. Although excellent toner images may be obtained with multilayered belt photoreceptors that are developed with dry developer powder (toner), it has been found that these same photoreceptors become unstable when employed with liquid development systems. These photoreceptors suffer from cracking, crazing, crystallization of active compounds, phase separation of activating compounds and extraction of activating compounds caused by contact with typical organic carrier fluids such as isoparaffinic hydrocarbons, e.g. Isopar, commonly employed in liquid developer inks. These carrier fluids markedly degrade the mechanical integrity and electrical properties of the photoreceptor. More specifically, the organic carrier fluid of a liquid developer tends to leach out activating small molecules, such as the arylamine containing compounds typically used in the charge transport layers. Representative of this class of materials are: N,N'-diphenyl-N,N'-bis(3-methylphenyl)-[1,1'-biphenyl]4-4,'-diamine; bis-(4-diethylamino-2-methylphenyl)-phenylmethane; 2,5-bis-(4'-dimethylaminophenyl)-1,3,4,-oxadiazole; 1-phenyl-3-(4'-diethylaminostyryl)-5-(4"-diethylaminophenyl)-pyrazoline; 1,1-bis-(4-(di-N,N'-p-methylphenyl)-aminophenyl)-cyclohexane; 4-diethylaminobenzaldehyde-1,1-diphenylhydrazone; 1,1-diphenyl-2(p-N,N-diphenyl amino phenyl)-ethylene; N-ethylcarbazole-3-carboxaldehyde-1-methyl-1phenylhydrazone. The leaching process results in crystallization of the activating small molecules, such as the aforementioned arylamine compounds, onto the photoreceptor surface and subsequent migration of arylamines into the liquid developer ink. In addition, the ink vehicle, typically a C10–C14 branched hydrocarbon, induces the formation of cracks and crazes in the photoreceptor surface. These effects lead to copy defects and shortened photoreceptor life. The degradation of the photoreceptor manifests itself as increased background and other printing defects prior to complete physical photoreceptor failure. The leaching out of the activating small molecule also increases the susceptibility of the transport layer to solvent/stress cracking when the belt is parked over a belt support roller during periods of non-use. Some carrier fluids may also promote phase separation of the activating small molecules, such as arylamine compounds, in the transport layers, particularly when high concentrations of the arylamine compounds are present in the transport layer binder. Phase separation of activating small molecules also adversely alters the electrical and mechanical properties of a photoreceptor. Similarly, single layer photoreceptors having a single active layer comprising photoconductive particles dispersed in a charge transport film forming binder are also vulnerable to the same degradation problems encountered by the previously described multilayered type of photoreceptor when exposed to liquid developers. Although flexing is normally not encountered with rigid, cylindrical, multilayered photoreceptors which utilize charge transport layers containing activating small molecules dispersed or dissolved in a polymeric film forming binder, electrical degradation are similarly encountered during development with liquid developers. Sufficient degradation of these photoreceptors by liquid developers can occur in less than two hours as indicated by leaching of the small molecule and cracking of the matrix polymer film. Continued exposure for several days severely damages the photoreceptor. Thus, in advanced imaging systems utilizing multilayered belt photoreceptors exposed to liquid development systems, cracking and crazing have been encountered in critical charge transport layers during belt cycling. Cracks developing in charge transport layers during cycling can be manifested as print-out defects adversely affecting copy quality. Furthermore, cracks in the photoreceptor pick up toner particles which cannot be removed in the cleaning step and may be transferred to the background in subsequent prints. In addition, crack areas are subject to delamination when contacted with blade cleaning devices thus limiting the options in electrophotographic product design.

Photoreceptors have been developed which comprise charge transfer complexes prepared with polymeric molecules. For example, charge transfer complexes formed with polyvinyl carbazole are disclosed in U.S. Pat. No. 4,047,948, U.S. Pat. No. 4,346,158 and U.S. Pat. No. 4,388,392. Photoreceptors utilizing polyvinyl carbazole layers, as compared with current photoreceptor requirements, exhibit relatively poor xerographic performance in both electrical and mechanical properties. Polymeric arylamine molecules prepared from the condensation or di-secondary amine with a di-iodo aryl compound are disclosed in European patent publication 34,425, published Aug. 26, 1981, issued May 16, 1984. Since these polymers are extremely brittle and form films which are very susceptible to physical damage, their use in a flexible belt configuration is precluded. Thus, in advanced imaging systems utilizing multilayered belt photoreceptors exposed to liquid development, cracking and crazing have been encountered in critical charge transport layers during belt cycling. Still other arylamine charge transporting polymers such as those disclosed in U.S. Pat. No. 4,806,444, U.S. Pat. No. 4,806,443, U.S. Pat. No.

4,935,487, and U.S. Pat. No. 5,030,532 are vulnerable to reduced life because of the highly abrasive conditions presented by imaging systems utilizing bias transfer rolls and/or bias charge rollers.

Protective overcoatings can be somewhat helpful against abrasion. However, most protective overcoatings also fail early when subjected to the highly abrasive conditions presented by imaging systems utilizing bias transfer rolls and/or bias charge rollers. Moreover, many overcoatings tend to accumulate residual charge during cycling. This can cause a condition known as cycle-up in which the residual potential continues to increase with multi-cycle operation. This can give rise to increased densities in the background areas of the final images.

Drum machines employing small diameter drum blanks coated with organic photoreceptors are even more susceptible to degradation since it takes many revolutions of the drum to make a single print. The wear in machines employing bias charge rolls and bias transfer rolls might be as much as 10 micrometers in less than 100,000 revolutions which could translate to as few as 10,000 prints. There is an urgent need for an effective overcoat for these drums. Since the drums are invariably dip coated, one of the requirements for the overcoat material requirements is ease and economical synthesis of the materials and a pot life of several weeks. Pot life is the life of the coating slurry without changes in slurry properties so that the same mixture can be used for several weeks. With coating compositions that ultimately cross link and provide wear protection, there is a danger of initiation of cross linking in the pot itself thereby rendering the remaining material in the pot useless for coating. Since the unused material must be discarded and the pot cleaned or replaced, this waste of material and effort has a significant negative impact on the manufacturing cost. In some instances phase separation of different constituents in the overcoat slurry and or changes in the viscosity impact the pot life of the coating slurry.

INFORMATION DISCLOSURE STATEMENT

U.S. Pat. No. 4,871,634 to W. Limburg et al., issued Oct. 3, 1989—A hydroxylarylamine compound, represented by a specific formula, is disclosed as employable in photoreceptors. The hydroxyarylamine compound can be used as an overcoating with the hydroxyarylamine compound bonded to a resin capable of hydrogen bonding such as a polyamide possessing alcohol solubility.

U.S. Pat. No. 5,368,967 to R. Schank et al., Nov. 29, 1994—An electrophotographic imaging member is disclosed comprising a substrate, a charge generating layer, a charge transport layer, and an overcoat layer comprising a small molecule hole transporting arylamine having at least two hydroxy functional groups, a hydroxy or multihydroxy triphenyl methane and a polyamide film forming binder capable of forming hydrogen bonds with the hydroxy functional groups of the hydroxy arylamine and the hydroxy or multihydroxy triphenyl methane. This overcoat layer may be fabricated using an alcohol solvent. This electrophotographic imaging member may be utilized in an electrophotographic imaging process.

U.S. Pat. No. 5,681,679 to R. Schank et. al., Oct. 28, 1997—A flexible electrophotographic imaging member is disclosed including a supporting substrate and a resilient combination of at least one photoconductive layer and an overcoating layer, the at least one photoconductive layer comprising a hole transporting arylamine siloxane polymer and the overcoating comprising a crosslinked polyamide doped with a dihydroxy amine. This imaging member may be utilized in an imaging process including forming an electrostatic latent image on the imaging member, depositing toner particles on the imaging member in conformance with the latent image to form a toner image, and transferring the toner image to a receiving member.

U.S. Pat. No. 5,709,974 to H. Yuh et. al., Jan. 20, 1998—An electrophotographic imaging member is disclosed including a charge generating layer, a charge transport layer and an overcoating layer, the transport layer including a charge transporting aromatic diamine molecule in a polystyrene matrix and the overcoating layer including a hole transporting hydroxy arylamine compound having at least two hydroxy functional groups and a polyamide film forming binder capable of forming hydrogen bonds with the hydroxy functional groups of the hydroxy arylamine compound. This imaging member is utilized in an imaging process.

U.S. Pat. No. 5,702,854 to Shank et al. Dec. 30, 1997—An electrophotographic imaging member is disclosed including a supporting substrate coated with at least a charge generating layer, a charge transport layer and an overcoating layer, said overcoating layer comprising a dihydroxy arylamine dissolved or molecularly dispersed in a crosslinked polyamide matrix. The overcoating layer is formed by crosslinking a crosslinkable coating composition including a polyamide containing methoxy methyl groups attached to amide nitrogen atoms, a crosslinking catalyst and a dihydroxy amine, and heating the coating to crosslink the polyamide. The electrophotographic imaging member may be imaged in a process involving uniformly charging the imaging member, exposing the imaging member with activating radiation in image configuration to form an electrostatic latent image, developing the latent image with toner particles to form a toner image, and transferring the toner image to a receiving member.

U.S. Pat. No. 5,670,291 to Ward et al., Sep. 23, 1997—A process for fabricating an electrophotographic imaging member is disclosed including providing a substrate coated with at least one photoconductive layer, applying a coating composition to the photoconductive layer by dip coating to form a wet layer, the coating composition comprising finely divided amorphous silica particles, a dihydroxy amine charge transport material, an aryl charge transport material that is different from the dihydroxy amine charge transport material, a crosslinkable polyamide containing methoxy groups attached to amide nitrogen atoms and a crosslinking catalyst, at least one solvent for the hydroxy amine charge transport material, aryl charge transport material that is different from the dihydroxy amine charge transport material and the crosslinkable polyamide, and heating the wet layer to crosslink the polyamide and remove the solvent to form a dry layer in which the dihydroxy amine charge transport material and the aryl charge transport material are molecularly dispersed in a crosslinked polyamide matrix.

U.S. Pat. No. 5,612,157 issued to Yuh et al. on Mar. 18, 1997—An electrophotographic imaging member is disclosed including a substrate, a hole blocking layer comprising hydrolyzed metal alkoxide or aryloxide molecules and a film forming alcohol soluble nylon polymer, an optional interface adhesive layer, a charge generating layer, and a charge transport layer.

CROSS REFERENCE TO RELATED APPLICATIONS

This application is related to the following U.S. patent application:

U.S. Pat. No. 5,976,744, issued Nov. 2, 1999, filed concurrently herewith in the names of Fuller et al., entitled "PHOTORECEPTOR OVERCOATINGS CONTAINING HYDROXY FUNCTIONALIZED AROMATIC DIAMINE, HYDROXY FUNCTIONALIZED TRIARYLAMINE AND CROSSLINKED ACRYLATED POLYAMIDE"—An electrophotographic imaging member is disclosed including
- a supporting substrate coated with
- at least one photoconductive layer, and
an overcoating layer, the overcoating layer including a
- a hydroxy functionalized aromatic diamine and
- a hydroxy functionalized triarylamine dissolved or molecularly dispersed in
- a crosslinked acrylated polyamide matrix, the hydroxy functionalized triarylamine being a compound different from the polyhydroxy functionalized aromatic diamine, the crosslinked polyamide prior to crosslinking being selected from the group consisting of materials represented by the following Formulae I and II:

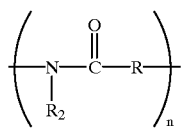

wherein:
- n is a positive integer sufficient to achieve a weight average molecular weight between about 5000 and about 100,000,
- R is an alkylene group containing from 1 to 10 carbon atoms,
- between 1 and 99 percent of the $R_2$ sites are

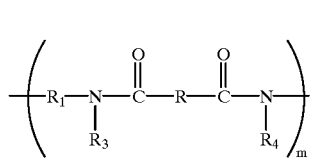

wherein X is selected from the group consisting of —H (acrylate), —$CH_3$ (methacrylate), alkyl and aryl, and the remainder of the $R_2$ sites are selected from the group consisting of —H, —$CH_2OCH_3$, and —$CH_2OH$, and

II wherein:
- m is a positive integer sufficient to achieve a weight average molecular weight between about 5000 and about 100000,
- R and $R_1$ are independently selected from the group consisting of alkylene units containing from 1 to 10 carbon atoms;
- between 1 and 99 percent of $R_3$ and $R_4$ are independently selected from the group consisting of

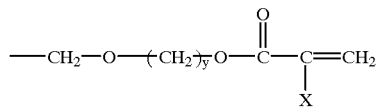

wherein
- X is selected from the group consisting of hydrogen, alkyl, aryl and alkylaryl, wherein the alkyl groups contain 1 to 10 carbon atoms and the aryl groups contain 1 to 3 alkyl groups.
- y is an integer between 1 and 10, and
- the remainder of the $R_3$ and $R_4$ groups are selected from the group consisting of —H, —$CH_2OH$, —$CH_2OCH_3$, and —$CH_2OC(O)$—$C(X)$=$CH_2$. The overcoating layer is formed by coating. The electrophotographic imaging member may be imaged in a process.

Thus, there is a continuing need for photoreceptors having improved resistance to abrasive cycling conditions and increased densities in the background areas of the final images, and cyclic instabilities. There is also continuing need for improved photoconductors usable in a liquid ink environment. In addition there is a continuing need for overcoat materials that are easily and economically synthesizable and scaleable. Further, there is continuing need for overcoat materials, that have a long pot life when made into a solution for dip coating.

SUMMARY OF THE INVENTION

It is, therefore, an object of the present invention to provide an improved electrophotographic imaging member which overcomes the above-noted deficiencies.

It is another object of the present invention to provide an improved electrophotographic imaging member capable of longer cycling life under abrasive imaging conditions.

It is yet another object of the present invention to provide an improved electrophotographic imaging member capable of longer cycling life under abrasive toner/cleaning blade interactions.

It is still another object of the present invention to provide an improved electrophotographic imaging member that is stable against electrical cycle up.

It is another object of the present invention to provide an improved electrophotographic imaging member that resists cracking in a liquid development environment.

It is yet another object of the present invention to provide an improved electrophotographic imaging member exhibiting increased resistance against rough handling in a copier image cycling environment.

It is still another object of the present invention to provide an improved electrophotographic imaging member exhibiting increased resistance against rough handling during installation and service.

It is another object of the present invention to provide an improved electrophotographic imaging member with an overcoat fabricated from easily and economically synthesizable materials.

It is yet another object of the present invention to provide an improved electrophotographic imaging member with an overcoat applied with a dip coating solution having a long pot life.

The foregoing objects and others are accomplished in accordance with this invention by providing an electrophotographic imaging member comprising a supporting substrate coated with at least one photoconductive layer and an overcoating layer, the overcoating layer comprising a polyhydroxy functionalized aromatic diamine with a hydroxy functionalized triarylamine dissolved or molecularly dispersed in a crosslinked polyamide matrix, the hydroxy functionalized triarylamine being a compound different from the polyhydroxy functionalized aromatic diamine, and the crosslinked polyamide prior to crosslinking being selected from the group consisting of materials represented by the following Formulae I and II:

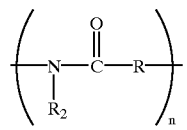

I wherein:
   n is a positive integer sufficient to achieve a weight average molecular weight between about 5000 and about 100,000,
   R is an alkylene unit containing from 1 to 10 carbon atoms,
   between 1 and 99 percent of the $R_2$ sites are —H, and the remainder of the $R_2$ sites are —$CH_2$—O—$CH_3$, and

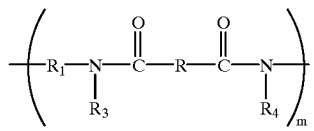

II wherein:
   m is a positive integer sufficient to achieve a weight average molecular weight between about 5000 and about 100000,
   $R_1$ and R are independently selected from the group consisting of alkylene units containing from 1 to 10 carbon atoms, and
   between 1 and 99 percent of the $R_3$ and $R_4$ sites are —H, and the remainder of the $R_3$ and $R_4$ sites are —$CH_2$—O—$CH_3$.

Other objects of this invention include providing coating compositions for the overcoating layer as well as methods of making and using the overcoated electrophotographic imaging member.

Electrophotographic imaging members are well known in the art. Electrophotographic imaging members may be prepared by any suitable technique. Typically, a flexible or rigid substrate is provided with an electrically conductive surface. At least one photoconductive layer is applied to the electrically conductive surface. Thus, as well known in the art of electrophotography, a single photoconductive layer comprising photoconductive particles dispersed in an electrically active matrix may be applied or a plurality of photoconductive layers, such as a charge generating layer and a separate charge transport layer may be applied to the electrically conductive surface. A charge blocking layer may optionally be applied to the electrically conductive surface prior to the application of the at least one photoconductive layer. If desired, an adhesive layer may be utilized between the charge blocking layer and the at least one photoconductive layer. Usually a charge generation layer is applied onto the blocking layer and a charge transport layer is formed on the charge generation layer. This structure may have the charge generation layer on top of or below the charge transport layer.

The substrate may be opaque or substantially transparent and may comprise any suitable material having the required mechanical properties. Accordingly, the substrate may comprise a layer of an electrically non-conductive or conductive material such as an inorganic or an organic composition. As electrically non-conducting materials here may be employed various resins known for this purpose including polyesters, polycarbonates, polyamides, polyurethanes, and the like which are flexible as thin webs. An electrically conducting substrate may be any metal, for example, aluminum, nickel, steel, copper, and the like or a polymeric material, as described above, filled with an electrically conducting substance, such as carbon, metallic powder, and the like or an organic electrically conducting material. The electrically insulating or conductive substrate may be in the form of an endless flexible belt, a web, a rigid cylinder, a sheet and the like.

The thickness of the substrate layer depends on numerous factors, including strength desired and economical considerations. Thus, for a drum, this layer may be of substantial thickness of, for example, up to many centimeters or of a minimum thickness of less than a millimeter. Similarly, a flexible belt may be of substantial thickness, for example, about 250 micrometers, or a minimum thickness less than 50 micrometers, provided there are no adverse effects on the final electrophotographic device.

In embodiments where the substrate layer is not conductive, the surface thereof may be rendered electrically conductive by an electrically conductive coating. The conductive coating may vary in thickness over substantially wide ranges depending upon the optical transparency, degree of flexibility desired, and economic factors. Accordingly, for a flexible photoresponsive imaging device, the thickness of the conductive coating may be between about 20 angstroms to about 200 angstroms for an optimum combination of electrical conductivity, flexibility and light transmission. The flexible conductive coating may be an electrically conductive metal layer formed, for example, on the substrate by any suitable coating technique, such as a vacuum depositing technique or electrodeposition. Typical metals include aluminum, zirconium, niobium, tantalum, vanadium and hafnium, titanium, nickel, stainless steel, chromium, tungsten, molybdenum, and the like.

An optional hole blocking layer may be applied to the substrate. Any suitable and conventional blocking layer capable of forming an electronic barrier to holes between the adjacent photoconductive layer and the underlying conductive surface of the substrate may be utilized.

An optional adhesive layer may be applied to the hole blocking layer. Any suitable adhesive layer well known in the art may be utilized. Typical adhesive layer materials include, for example, polyesters, polyurethanes, and the like. Satisfactory results may be achieved with adhesive layer thickness between the 0.05 micrometer (500 angstroms) and about 0.3 micrometer (3,000 angstroms). Conventional techniques for applying an adhesive layer coating mixture to the charge blocking layer include spraying, dip coating, roll coating, wire wound rod coating, gravure coating, bird applicator coating, and the like. Drying of the deposited coating may be effected by any suitable conventional technique such as oven drying, infra red radiation drying, air drying and the like. Any suitable polymeric film forming binder material may be employed as the matrix in the charge generating (photogenerating) binder layer. Typical polymeric film forming materials include those described, for example, in U.S. Pat. No. 3,121,006, the entire disclosure of which is incorporated herein by reference. Thus, typical organic polymeric film forming binders include thermoplastic and thermosetting resins such as polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl acetate, polysiloxanes, polyacrylates, polyvinyl acetals, polyamides polyimides, amino resins, phenylene oxide resins, terephthalic acid resins, phenoxy resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly (amideimide), styrene-butadiene copolymers, vinylidenechloride-vinylchloride copolymers, vinylacetate-vinylidenechloride copolymers, styrene-alkyd resins, polyvinylcarbazole, and the like. These polymers may be block, random or alternating copolymers.

The photogenerating composition or pigment is present in the resinous binder composition in various amounts. Generally, however, from about 5 percent by volume to about 90 percent by volume of the photogenerating pigment is dispersed in about 10 percent by volume to about 95 percent by volume of the resinous binder, and preferably from about 20 percent by volume to about 30 percent by volume of the photogenerating pigment is dispersed in about 70 percent by volume to about 80 percent by volume of the resinous binder composition. In one embodiment about 8 percent by volume of the photogenerating pigment is dispersed in about 92 percent by volume of the resinous binder composition. The photogenerator layers can also be fabricated by vacuum sublimation in which case there is no binder.

Any suitable and conventional technique may be utilized to mix and therefore apply the photogenerating layer coating mixture. Typical application techniques include spraying, dip coating, roll coating, wire wound rod coating, vacuum sublimation and the like. For some applications, the generator layer may be fabricated in a dot or line pattern. Removing of the solvent of a solvent coated layer may be effected by any suitable conventional technique such as oven drying, infrared radiation drying, air drying and the like.

The charge transport layer may comprise a charge transporting small molecule dissolved or molecularly dispersed in a film forming electrically inert polymer such as a polycarbonate. The term "dissolved" as employed herein is defined herein as forming a solution in which the small molecule is dissolved in the polymer to form a homogeneous phase. The expression "molecularly dispersed" is used herein is defined as a charge transporting small molecule dispersed in the polymer, the small molecules being dispersed in the polymer on a molecular scale. Any suitable charge transporting or electrically active small molecule may be employed in the charge transport layer of this invention. The expression charge transporting "small molecule" is defined herein as a monomer that allows the free charge photogenerated in the transport layer to be transported across the transport layer. Typical charge transporting small molecules include, for example, pyrazolines such as 1-phenyl-3-(4'-diethylamino styryl)-5-(4"-diethylamino phenyl) pyrazoline, diamines such as N,N'-diphenyl-N,N'-bis(3-methylphenyl)-(1,1-biphenyl)-4,4'-diamine, hydrazones such as N-phenyl-N-methyl-3-(9-ethyl) carbazyl hydrazone and r-diethyl amino benzaldehyde-1,2-diphenyl hydrazone, and oxadiazoles such as 2,5-bis (4-N,N'-diethylaminophenyl)-1,2,4-oxadiazole, stilbenes and the like. However, to avoid cycle-up, the charge transport layer should be substantially free of triphenyl methane. As indicated above, suitable electrically active small molecule charge transporting compounds are dissolved or molecularly dispersed in electrically inactive polymeric film forming materials. A small molecule charge transporting compound that permits injection of holes from the pigment into the charge generating layer with high efficiency and transports them across the charge transport layer with very short transit times is N,N'-diphenyl-N,N'-bis(3-methylphenyl)-(1,1'-biphenyl)-4,4'-di-amine.

Any suitable electrically inert polymeric binder may be used to disperse the electrically active molecule in the charge transport layer. Typical inert polymeric binders include, for example, poly (4,4'-isopropylidene-diphenylene) carbonate (also referred to as bisphenol-A-polycarbonate), poly (4,4'-isopropylidene-diphenylene) carbonate, poly (4,4'-diphenyl-1,1'-cyclohexane carbonate), and the like. Other typical inactive resin binders include polyester, polyarylate, polyacrylate, polyether, polysulfone, and the like. Weight average molecular weights can vary, for example, from about 20,000 to about 150,000. However, weight average molecular waits outside this range may be utilized where suitable.

Instead of a small molecule charge transporting compound dissolved or molecularly dispersed in an electrically inert polymeric binder, the charge transport layer may comprise any suitable charge transporting polymer. Typical charge transporting polymers include those obtained from the condensation of hydroxy diamines and chloroformates such as N,N'-diphenyl-N,N-bis (3-hydroxy phenyl)-[1-1'-biphenyl]-4,4'-diamine and diethylene glycol bischloroformate such as disclosed in the U.S. Pat. No. 4,8706,443 and U.S. Pat. No. 5,028,687, the entire disclosures of these patents being incorporated herein by reference. Another typical charge transporting polymer is poly (N,N'-bis-(3-oxyphenyl)-N,N'-diphenyl [1,1'-biphenyl]-4,4'-diaminesebacoyl) polyethercarbonate obtained from the condensation of N,N'-diphenyl-N,N'-bis (3-hydroxy phenyl)-[1,1'-biphenyl]-4,4'-diamine and sebacoyl chloride.

Any suitable and conventional technique may be utilized to mix and thereafter apply the charge transport layer coating mixture to the charge generating layer. Typical application techniques include spraying, dip coating, roll coating, wire wound rod coating, and the like. Drying of the deposited coating may be affected by any suitable conventional technique such as oven drying, infra red radiation drying, air drying and the like.

Generally, the thickness of the charge transport layer is between about 10 and about 50 micrometers, but thicknesses outside this range can also be used. The hole transport layer should be an insulator to the extent that the electrostatic charge placed on the hole transport layer is not conducted in the absence of illumination at a rate sufficient to prevent formation and retention of an electrostatic latent image thereon. In general, the ratio of the thickness of the hole transport layer to the charge generator layers is preferably maintained from about 2:1 to 200:1 and in some instances as great as 400:1. In other words, the charge transport layer is substantially non-absorbing to visible light or radiation in the region of intended use but is electrically "active" in that it allows the injection of photogenerated holes from the photoconductive layer, i.e., charge generation layer, and allows these holes to be transported through itself to selectively discharge a surface charge on the surface of the active layer.

The overcoat layer of this invention comprises a mixture of a polyhydroxy functionalized aromatic diamine and a hydroxy functionalized triarylamine dissolved or molecularly dispersed in a crosslinked polyamide matrix, the hydroxy functionalized triarylamine being a compound different from the polyhydroxy functionalized aromatic diamine. The overcoat layer is formed from a crosslinkable coating composition comprising an alcohol soluble polyamide containing methoxy methyl groups attached to amide nitrogen atoms, a crosslinking catalyst and a mixture of a polyhydroxy functionalized aromatic diamine with a hydroxy functionalized triarylamine, the hydroxy functionalized triarylamine being a compound different from the polyhydroxy functionalized aromatic diamine.

Any suitable hole insulating film forming alcohol soluble crosslinkable polyamide polymer having methoxy methyl groups attached to the nitrogen atoms of amide groups in the polymer backbone prior to crosslinking may be employed in the overcoating of this invention. A preferred alcohol soluble polyamide polymer having methoxy methyl groups attached to the nitrogen atoms of amide groups in the polymer backbone prior to crosslinking is selected from the group consisting of materials represented by the following Formulae I and II:

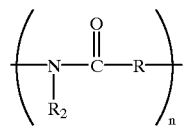

I wherein:
n is a positive integer sufficient to achieve a weight average molecular weight between about 5000 and about 100,000,
R is an alkylene unit containing from 1 to 10 carbon atoms,
between 1 and 99 percent of the $R_2$ sites are —H, and the remainder of the $R_2$ sites are —$CH_2$—O—$CH_3$, and

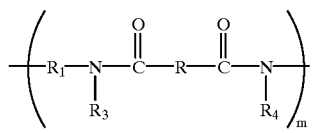

II wherein:
m is a positive integer sufficient to achieve a weight average molecular weight between about 5000 and about 100000,
$R_1$ and R are independently selected from the group consisting of alkylene units containing from 1 to 10 carbon atoms, and
between 1 and 99 percent of the $R_3$ and $R_4$ sites are —H, and the remainder of the $R_3$ and $R_4$ sites are —$CH_2$—O—$CH_3$.

For R in Formula I, optimum results are achieved when the number of alkylene units containing less than 6 carbon atoms are about 40 percent of the total number of alkylene units. For R and $R_1$ in Formula II, optimum results are achieved when the number of alkylene units containing less than 6 carbon atoms are about 40 percent of the total number of alkylene units. Preferably, the alkylene unit R in polyamide Formula I is selected from the group consisting of $(CH_2)_4$ and $(CH_2)_6$, the alkylene units $R_1$ and R in polyamide Formula II are independently selected from the group consisting of $(CH_2)_4$ and $(CH_2)_6$, and the concentration of $(CH_2)_4$ and $(CH_2)_6$ is between about 40 percent and about 60 percent of the total number of alkylene units in the polyamide of the polyamide of Formula I or the polyamide of Formula II. Between about 1 percent and about 50 mole percent of the total number of repeat units of the polyamide polymer should contain methoxy methyl groups attached to the nitrogen atoms of amide groups. These polyamides should form solid films if dried prior to crosslinking. The polyamide should also be soluble, prior to crosslinking, in the alcohol solvents employed.

A preferred polyamide is represented by the following formula:

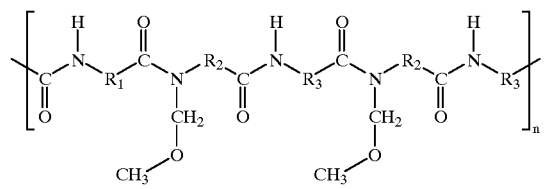

wherein $R_1$, $R_2$ and $R_3$ are alkylene units independently selected from units containing from 1 to 10 carbon atoms, and
n is a positive integer sufficient to achieve a weight average molecular weight between about 5000 and about 100,000.

For R, $R_1$ and $R_3$ in Formula II, optimum results are achieved when the number of alkylene units containing less than 6 carbon atoms are about 40 percent of the total number of alkylene units.

Typical alcohols in which the polyamide is soluble include, for example, butanol, ethanol, methanol, and the like. Typical alcohol soluble polyamide polymers having methoxy methyl groups attached to the nitrogen atoms of amide groups in the polymer backbone prior to crosslinking include, for example, hole insulating alcohol soluble polyamide film forming polymers such as Luckamide 5003 from Dai Nippon Ink, Nylon 8 with methylmethoxy pendant groups, CM4000 from Toray Industries, Ltd. and CM8000 from Toray Industries, Ltd. and other N-methoxymethylated polyamides, such as those prepared according to the method described in Sorenson and Campbell "Preparative Methods of Polymer Chemistry" second edition, pg. 76, John Wiley & Sons Inc. 1968, and the like and mixtures thereof. These polyamides can be alcohol soluble, for example, with polar functional groups, such as methoxy, ethoxy and hydroxy groups, pendant from the polymer backbone. It should be noted that polyamides, such as Elvamides from DuPont de Nemours & Co., do not contain methoxy methyl groups attached to the nitrogen atoms of amide groups in the polymer backbone. The overcoating layer of this invention preferably comprises between about 50 percent by weight and about 98 percent by weight of the crosslinked film forming crosslinkable alcohol soluble polyamide polymer having methoxy methyl groups attached to the nitrogen atoms of the amide groups in the polymer backbone, based on the total weight of the overcoating layer after crosslinking and drying. These film forming polyamides are also soluble in a solvent to facilitate application by conventional coating techniques. Typical solvents include, for example, butanol, propanol, methanol, butyl acetate, ethanol, cyclohexanone, tetrahydrofuran, methyl ethyl ketone, and the like and mixtures thereof. Crosslinking is accomplished by heating in the presence of a catalyst. Any suitable catalyst may be employed. Typical catalysts include, for example, oxalic acid, maleic acid, carbollylic acid, ascorbic acid, malonic acid, succinic acid, tartaric acid, citric acid, p-toluenesulfonic acid, methanesulfonic acid, and the like and mixtures thereof. The temperature used for crosslinking varies with the specific catalyst and heating time utilized and the degree of crosslinking desired. Generally, the degree of crosslinking selected depends upon the desired flexibility of the final photoreceptor. For example, complete crosslinking may be used for rigid drum or plate photoreceptors. However, partial crosslinking is preferred for flexible photoreceptors having, for example, web or belt configurations. The degree of crosslinking can be controlled by the relative amount of catalyst employed. The amount of catalyst to achieve a desired degree of crosslinking will vary depending upon the specific polyamide, catalyst, temperature and time used for the reaction. A typical crosslinking temperature used for Luckamide with oxalic acid as a catalyst is about 125° C. for 30 minutes. A typical concentration of oxalic acid is between 5 and 10 weight percent based on the weight of Luckamide. After crosslinking, the overcoating should be substantially insoluble in the solvent in which it was soluble prior to crosslinking. Thus, no overcoating material will be removed when rubbed with a cloth soaked in the solvent. Crosslinking results in the development of a three dimensional network which restrains the hydroxy functionalized transport molecule as a fish is caught in a gill net.

The overcoating of this invention includes a mixture of a polyhydroxy functionalized aromatic diamine and a hydroxy functionalized triarylamine. The expression "hydroxy functionalized" as employed herein is defined as incorporation of a phenolic moiety. The prefix "poly" in term "polyhydroxy" as employed herein is defined as a compound containing at least two hydroxy groups. The hydroxy functionalized triarylamine is a compound different from the polyhydroxy functionalized aromatic diamine. Preferably, the polyhydroxy functionalized aromatic diamine is represented by the following formula:

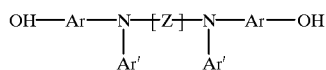

wherein:

Z is selected from the group consisting of:

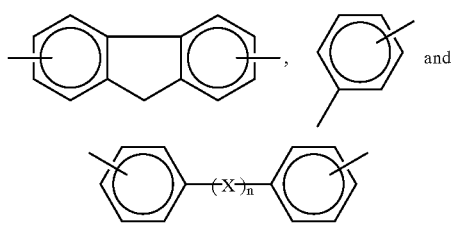

n is 0 or 1,

Ar is selected from the group consisting of:

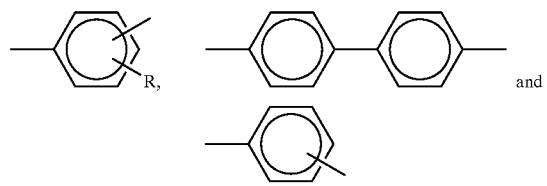

R is selected from the group consisting of —CH$_3$, —C$_2$H$_5$, —C$_3$H$_7$, and —C$_4$H$_9$, Ar' is selected from the group consisting of:

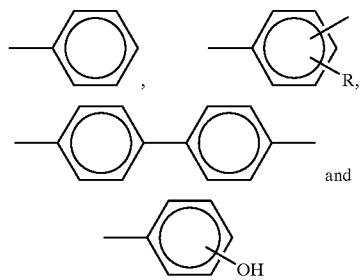

X is selected from the group consisting of:

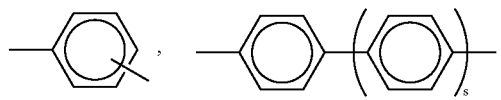

s is 0, 1 or 2, the hydroxy functionalized aromatic diamine compound being free of any direct conjugation between —OH groups and the nearest nitrogen atom through one or more aromatic rings.

Typical examples of polyhydroxy functionalized aromatic diamines include, for example, polyhydroxy functionalized aromatic diamines containing two hydroxyl groups such as N,N'-diphenyl-N,N'-bis(3-hydroxyphenyl)-[1,1'-biphenyl]-4,4'-diamine; N,N,N',N',-tetra(3-hydroxyphenyl)-[1,1'-biphenyl]-4,4'-diamine; N,N'-diphenyl-N,N'-bis(3-hydroxyphenyl)-[1,1':4',1"-terphenyl]-4,4"-diamine, N,N'-diphenyl-N,N'-bis(4-hydroxyphenyl)-[1,1'-biphenyl]-4,4"-diamine, and the like. A specific preferred hydroxy functionalized aromatic diamine compound is N,N'-diphenyl-N,N'-bis(3-hydroxyphenyl)-[1,1'-biphenyl]-4,4'-diamine represented by the formula:

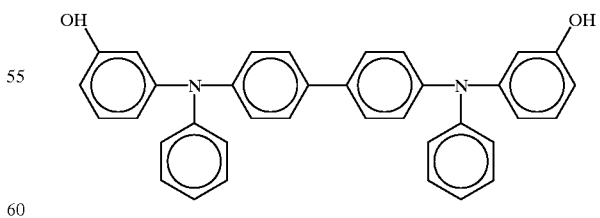

Examples of these polyhydroxy functionalized aromatic diamines are described, for example, in U.S. Pat. No. 4,871,634, the entire disclosure thereof being incorporated herein by reference.

The hydroxy functionalized triarylamine compound employed to form the overcoating of this invention is a compound different from the polyhydroxy functionalized aromatic diamine. Thus, for example, the hydroxy functionalized triarylamine compound contains a single nitrogen atom whereas the polyhydroxy functionalized aromatic diamine contains two nitrogen atoms. The hydroxy functionalized triarylamine compound my be represented by the formula:

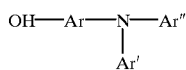

wherein:

Ar is selected from the group consisting of:

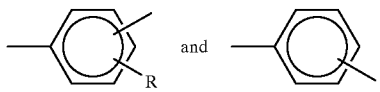

R is selected from the group consisting of —CH$_3$, —C$_2$H$_5$, —C$_3$H$_7$ and —C$_4$H$_9$, Ar' and Ar" are independently selected from the group consisting of:

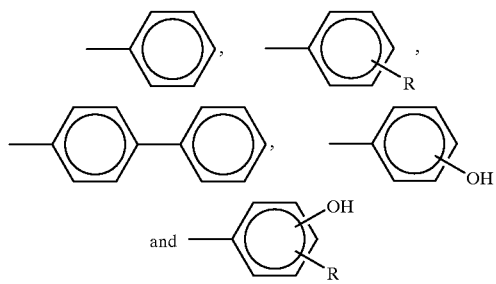

R is selected from the group consisting of —CH$_3$, —C$_2$H$_5$, —C$_3$H$_7$ and —C$_4$H$_9$, the hydroxy functionalized triarylamine compound being free of any direct conjugation between the —OH groups and the nearest nitrogen atom through one or more aromatic rings.

Typical hydroxy functionalized triarylamine compounds of this invention include, for example:

N-(3-hydroxyphenyl)-N-(4-methylphenyl)-N-phenyl amine;
N-(3-hydroxyphenyl)-N-bis(4-methylphenyl)amine
N,N-di(3-hydroxyphenyl)-m-toludine;
1,1-bis-[4-(di-N,N-m-hydroxpyphenyl)-aminophenyl]-cyclohexane;
1,1-bis[4-(N-m-hydroxyphenyl)-4-(N-phenyl)-aminophenyl]-cyclohexane;
N,N-di(4-hydroxyphenyl)-m-toluidine;
1,1-bis-[4-di-N,N-p-hydroxypyphenyl)-aminophenyl]-cyclohexane;
bis-N,N-[4'-hydroxy-4-(1,1'-biphenyl)]-aniline;
bis-N,N-[(2'-hydroxy-4-(1,1'-biphenyl)]-aniline, and the like.

Two specific preferred hydroxy functionalized triarylamine compounds are N-(3-hydroxyphenyl)-N-(4-methylphenyl)-N-phenyl amine (PTAP) and N-(3-hydroxyphenyl)-N-bis(4-methylphenyl)amine (DTAP) which are represented, respectively, by the formulae:

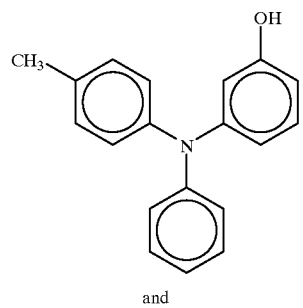

and

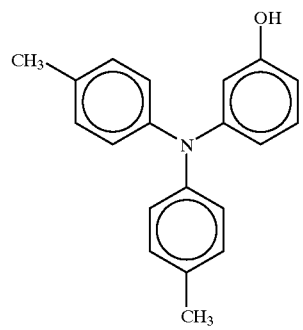

and mixtures thereof.

The total concentration of polyhydroxy functionalized aromatic diamine and hydroxy functionalized triarylamine in the overcoat can, for example, be between about 3 percent and about 75 percent by weight, based on the total weight of the dried overcoat. Preferably, the total concentration of hydroxy functionalized aromatic diamine and hydroxy functionalized triarylamine in the overcoat layer is between about 30 percent by weight and about 60 percent by weight, based on the total weight of the dried overcoat. When less than about 30 percent by weight of hydroxy functionalized aromatic diamine and hydroxy functionalized triarylamine is present in the overcoat, a slight loss of sensitivity and a change in Photo-Induced Discharge Characteristics (PIDC) shape may develop resulting from very low hole mobilities in the overcoat layer. When less than about 3 per cent by weight of hydroxy functionalized aromatic diamine and hydroxy functionalized triarylamine is present in the overcoat, charge transport is small resulting in a high residual potential observed across the overcoat. The overcoating of this invention is hole transporting. If the amount of hydroxy functionalized aromatic diamine and hydroxy functionalized triarylamine in the overcoat exceeds about 60 percent by weight based on the total weight of the dried overcoating layer, crystallization may occur resulting in residual cycle-up. If the amount of hydroxy functionalized aromatic diamine and hydroxy functionalized triarylamine in the overcoat exceeds about 75 percent by weight based on the total weight of the dried overcoating layer, crystallization occurs resulting in residual cycle-up as well as high wear when operated under bias charging roll conditions. In addition, mechanical properties, abrasive wear properties may be negatively impacted. Satisfactory results may be achieved when the ratio of hydroxy functionalized triarylamine to hydroxy functionalized aromatic diamine is between about 0.1 to about 2. Preferably, the ratio of hydroxy functionalized triarylamine to hydroxy functionalized aromatic diamine is between about 0.2 to about 1. Too little hydroxyfunctionalized triarylamine results in a composition that is prone to corona deletion and too high a concentration of hydroxyfunctionalized triarylamine results in a reduction in wear life (or increased wear rates).

The thickness of the continuous overcoat layer selected depends upon the abrasiveness of the charging (e.g., bias charging roll), cleaning (e.g., blade or web), development (e.g., brush), transfer (e.g., bias transfer roll), etc., in the system employed and can range up to about 10 micrometers. A thickness of between about 1 micrometer and about 5 micrometers in thickness is preferred. Any suitable and conventional technique may be utilized to mix and thereafter apply the overcoat layer coating mixture to the charge generating layer. Typical application techniques include spraying, dip coating, roll coating, wire wound rod coating, and the like. Drying of the deposited coating may be effected by any suitable conventional technique such as oven drying, infrared radiation drying, air drying and the like. The dried overcoating of this invention should transport holes during imaging and should not have too high a free carrier concentration. Free carrier concentration in the overcoat increases the dark decay. Preferably the dark decay of the overcoated layer should be about the same as that of the unovercoated device.

Prolonged attempts to extract the highly fluorescent hydroxy functionalized aromatic diamine hole transport molecule from the crosslinked overcoat, using long exposure to branched hydrocarbon solvents, revealed that the transport molecule is completely immobilized. Thus, when UV light is used to examine the extract or the applicator pad no fluorescence is observed. The molecule, in addition to being trapped in the web, is also held in the overcoat by hydrogen bonding to amide sites on the polyamide. Therefore, the crosslinked overcoat of this invention is substantially insoluble in any solvent in which it was soluble prior to crosslinking and insoluble in and non-absorbing in liquid ink vehicles.

Although it is not entirely clear, some interaction, e.g. hydrogen bonding, may or may not occur between the components combined to form the overcoating layer. Thus, the final overcoating layer of the photoreceptor of this invention includes the recited components in the overcoating layer in non-interacted form, hydrogen bonded form or any other interacted form which inherently occurs when the recited components are combined to form the overcoating layer.

Other suitable layers may also be used such as a conventional electrically conductive ground strip along one edge of the belt or drum in contact with the conductive surface of the substrate to facilitate connection of the electrically conductive layer of the photoreceptor to ground or to an electrical bias. Ground strips are well known and usually comprise conductive particles dispersed in a film forming binder.

In some cases an anti-curl back coating may be applied to the side opposite the photoreceptor to provide flatness and/or abrasion resistance for belt or web type photoreceptors. These anti-curl back coating layers are well known in the art and may comprise thermoplastic organic polymers or inorganic polymers that are electrically insulating or slightly semiconducting.

The photoreceptor of this invention may be used in any conventional electrophotographic imaging system such as copiers, duplicators, printers, facsimile and multifunctional systems. As described above, electrophotographic imaging usually involves depositing a uniform electrostatic charge on the photoreceptor, exposing the photoreceptor to a light image pattern to form an electrostatic latent image on the photoreceptor, developing the electrostatic latent image with electrostatically attractable marking particles to form a visible toner image, transferring the toner image to a receiving member. The depositing, exposing, developing and transferring steps are usually repeated at least once.

A number of examples are set forth hereinbelow and are illustrative of different compositions and conditions that can be utilized in practicing the invention. All proportions are by weight unless otherwise indicated. It will be apparent, however, that the invention can be practiced with many types of compositions and can have many different uses in accordance with the disclosure above and as pointed out hereinafter.

EXAMPLE I

Four photoreceptors were prepared by forming coatings using conventional techniques on a substrate comprising a vacuum deposited titanium layer on a polyethylene terephthalate film. The first coating formed on the titanium layer was a siloxane barrier layer formed from hydrolyzed gamma aminopropyltriethoxysilane having a thickness of 0.005 micrometer (50 Angstroms). The barrier layer coating composition was prepared by mixing 3-aminopropyltriethoxysilane (available from PCR Research Center Chemicals of Florida) with ethanol in a 1:50 volume ratio. The coating composition was applied by a multiple clearance film applicator to form a coating having a wet thickness of 0.5 mil. The coating was then allowed to dry for minutes at room temperature, followed by curing for 10 minutes at 110 degree centigrade in a forced air oven. The second coating was an adhesive layer of polyester resin (49,000, available from E.I. duPont de Nemours & Co.) having a thickness of 0.005 micron (50 Angstroms). The second coating composition was applied using a 0.5 mil bar and the resulting coating was cured in a forced air oven for 10 minutes. This adhesive interface layer was thereafter coated with a photogenerating layer containing 40 percent by volume hydroxygallium phthalocyanine and 60 percent by volume of a block copolymer of styrene (82 percent)/4-vinyl pyridine (18 percent) having a Mw of 11,000. This photogenerating coating composition was prepared by dissolving 1.5 grams of the block copolymer of styrene/4-vinyl pyridine in 42 ml of toluene. To this solution was added 1.33 grams of hydroxygallium phthalocyanine and 300 grams of ⅛ inch diameter stainless steel shot. This mixture was then placed on a ball mill for 20 hours. The resulting slurry was thereafter applied to the adhesive interface with a Bird applicator to form a layer having a wet thickness of 0.25 mil. This layer was dried at 135° C. for 5 minutes in a forced air oven to form a photogenerating layer having a dry thickness 0.4 micrometer. The next applied layer was a transport layer which was formed by using a Bird coating applicator to apply a solution containing one gram of N,N'-diphenyl-N, N'-bis(3-methyl-phenyl)-(1,1'-biphenyl)-4,4'-diamine and one gram of polycarbonate resin [poly(4,4'-isopropylidene-diphenylene carbonate (available as MakrolonR from Farbenfabricken Bayer A.G.) dissolved in 11.5 grams of methylene chloride solvent. The N,N'-diphenyl-N,N'-bis(3-methyl-phenyl)-(1,1'-biphenyl)-4,4'-diamine is an electrically active aromatic diamine charge transport small molecule whereas the polycarbonate resin is an electrically inactive film forming binder. The coated device was dried at 80° C. for half an hour in a forced air oven to form a dry 25 micrometer thick charge transport layer.

EXAMPLE II

One of the four devices of Example I was overcoated with an overcoat layer material of the prior art (cross linked overcoat of U.S. Pat. No. 5,702,854). Prior to application of the overcoat layer, the photoreceptor of Example I was primed by applying 0.1 percent by weight of Elvacite 2008 in 90:10 weight ratio of isopropyl alcohol and water using a #3 Meyer rod. This prime coating was air dried in the hood. The overcoat layer was prepared by mixing 10 grams of a 10 percent by weight solution of polyamide containing methoxymethyl groups (Luckamide 5003, available from Dai Nippon Ink) in a 90:10 weight ratio solvent of methanol and n-propanol and 20 grams of N,N'-diphenyl-N,N'-bis(3-hydroxyphenyl)-[1,1-biphenyl]-4,4"-diamine, a hydroxy functionalized aromatic diamine, in a roll mill for 2 hours. Immediately prior to application of the overcoat layer mixture, 0.1 gram of oxalic acid was added and the resulting mixture was roll milled briefly to assure dissolution. This coating solution was applied to the primed photoreceptor using a #20 Mayer rod. This overcoat layer was air dried in a hood for 30 minutes. The air dried film was then dried in a forced air oven at 125° C. for 30 minutes. The overcoat layer thickness was approximately 3 micrometers. The oxalic acid caused crosslinking of the methoxymethyl groups of the polyamide to yield a tough, abrasion resistant, hydrocarbon liquid resistant top surface.

EXAMPLE III

One of the four devices of Example I was overcoated with an overcoat layer material of this invention. Prior to application of the overcoat layer, the photoreceptor of Example I was primed by applying 0.1 percent by weight of Elvacite 2008 in 90:10 weight ratio of isopropyl alcohol and water using a #3 Meyer rod. This prime coating was air dried in a hood. The overcoat layer was prepared by mixing 10 grams of a 10 percent by weight solution of polyamide containing methoxymethyl groups (Luckamide 5003, available from Dai Nippon Ink) in a 90:10 weight ratio solvent of methanol and n-propanol and 5 grams of N,N'-diphenyl-N,N'-bis(3-hydroxyphenyl)-[1,1-biphenyl]-4,4"-diamine, a hydroxy functionalized aromatic diamine, and 5 grams of N-(3-hydroxyphenyl)-N-(4-methylphenyl)-N-phenyl amine, a hydroxy functionalized triarylamine, in a roll mill for 2 hours. Immediately prior to application of the overcoat layer mixture, 0.1 gram of oxalic acid was added and the resulting mixture was roll milled briefly to assure dissolution. This coating solution was applied to the primed photoreceptor using a #20 Mayer rod. This overcoat layer was air dried in a hood for 30 minutes. The air dried film was then dried in a forced air oven at 125° C. for 30 minutes. The overcoat layer thickness was approximately 3 micrometers. The oxalic acid caused crosslinking of the methoxymethyl groups of the polyamide to yield a tough, abrasion resistant, hydrocarbon liquid resistant top surface.

EXAMPLE IV

One of the four devices of Example I was overcoated with an overcoat layer material of this invention. Prior to application of the overcoat layer, the photoreceptor of Example I was primed by applying 0.1 percent by weight of Elvacite 2008 in 90:10 weight ratio of isopropyl alcohol and water using a #3 Meyer rod. This prime coating was air dried in the hood. The overcoat layer was prepared by mixing 10 grams of a 10 percent by weight solution of polyamide containing methoxymethyl groups (Luckamide 5003, available from Dai Nippon Ink) in a 90:10 weight ratio solvent of methanol and n-propanol and 5 grams of N,N'-diphenyl-N,N'-bis (3-hydroxyphenyl)-[1,1-biphenyl]-4,4"-diamine (a hydroxy functionalyzed aromatic diamine) and 5 grams of N-(3-hydroxyphenyl)-N-bis(4-methylphenyl)amine (a hydroxy functionalized triarylamine) in a roll mill for 2 hours. Immediately prior to application of the overcoat layer mixture, 0.1 gram of oxalic acid was added and the resulting mixture was roll milled briefly to assure dissolution. This coating solution was applied to the primed photoreceptor using a #20 Mayer rod. This overcoat layer was air dried in a hood for 30 minutes. The air dried film was then dried in a forced air oven at 125° C. for 30 minutes. The overcoat layer thickness was approximately 3 micrometers. The oxalic acid caused crosslinking of the methoxymethyl groups of the polyamide to yield a tough, abrasion resistant, hydrocarbon liquid resistant top surface.

EXAMPLE V

Devices of Example I (device without the overcoat), Example II (device with the cross linked overcoat of U.S. Pat. No. 5,702,854) and Example III and IV (devices containing a mixture of a hydroxy functionalized aromatic diamine with a hydroxy functionalized triarylamine in the cross linked overcoat of this invention) were first tested for xerographic sensitivity and cyclic stability. Each photoreceptor device was mounted on a cylindrical aluminum drum substrate which is rotated on a shaft of a scanner. Each photoreceptor was charged by a corotron mounted along the periphery of the drum. The surface potential was measured as a function of time by capacitively coupled voltage probes placed at different locations around the shaft. The probes were calibrated by applying known potentials to the drum substrate. The photoreceptors on the drums were exposed by a light source located at a position near the drum downstream from the corotron. As the drum was rotated, the initial (pre-exposure) charging potential was measured by voltage probe 1. Further rotation leads to the exposure station, where the photoreceptor was exposed to monochromatic radiation of known intensity. The photoreceptor was erased by light source located at a position upstream of charging. The measurements made included charging of the photoreceptor in a constant current of voltage mode. The photoreceptor was charged to a negative polarity corona. As the drum was rotated, the initial charging potential was measured by voltage probe 1. Further rotation lead to the exposure station, where the photoreceptor was exposed to monochromatic radiation of known intensity. The surface potential after exposure was measured by voltage probes 1 and 2. The photoreceptor was finally exposed to an erase lamp of appropriate intensity and any residual potential was measured by voltage probe 4. The process was repeated with the magnitude of the exposure automatically changed during the next cycle. The photodischarge characteristics was obtained by plotting the potentials at voltage probes 2 and 3 as a function of light exposure. The charge acceptance and dark decay were also measured in the scanner. A slight increase in sensitivity was observed in the overcoated photoreceptors. This increase corresponded to the three micrometer increase in thickness due to the presence of the overcoatings. The residual potential was equivalent (15 volts) for all three photoreceptors and no cycle-up was observed when cycled for 10,000 cycles in a continuous mode. The overcoat clearly did not introduce any deficiencies.

EXAMPLE VI

Deletion resistance test: A negative corotron was operated (with high voltage connected to the corotron wire) opposite a grounded electrode for several hours. The high voltage was turned off, and the corotron was placed (or parked) for thirty minutes on a segment of the photoconductor device being tested. Only a short middle segment of the photoconductor device was thus exposed to the corotron effluents. Unexposed regions on either side of the exposed regions were used as controls. The photoconductor device was then tested in a scanner for positive charging properties for systems employing donor type molecules. These systems were operated with negative polarity corotron in the latent image formation step. An electrically conductive surface region (excess hole concentration) appears as a loss of positive charge acceptance or increased dark decay in the exposed regions (compared to the unexposed control areas on either side of the short middle segment). Since the electrically conductive region is located on the surface of the photoreceptor device, a negative charge acceptance scan is not affected by the corotron effluent exposure (negative charges do not move through a charge transport layer made up of donor molecules). However, the excess carriers on the surface cause surface conductivity resulting in loss of image resolution, and in severe cases, causes deletion. The photoreceptor devices of Example II of the prior art and of Examples III and IV of the present invention were tested for deletion resistance. The region not exposed to corona effluents charged to 1000 volts positive in all devices. However the corona exposed region of the device of Example II of the prior art charged to 500 volts (a loss of 500 volts of charge acceptance) whereas the corona exposed regions of the devices of Examples III and IV were charged to 875 volts (a loss of only 125 volts of charge acceptance). Thus, the composition of this invention has improved deletion resistance by a factor of slightly over 4.

EXAMPLE VII

Overcoat Pot life test: An overcoat coating mixture of Example II of the prior art consisting of 10 grams of a 10 percent by weight solution of polyamide containing methoxymethyl groups (Luckamide 5003, available from Dai Nippon Ink) in a 90:10 weight ratio solvent of methanol and n-propanol and 10 grams of N,N'-diphenyl-N,N'-bis(3-hydroxyphenyl)-[1,1-biphenyl]-4,4"-diamine was mixed with 0.1 gram of oxalic acid. An overcoat coating mixture of Example III of the present invention consisting of 10 grams of a 10 percent by weight solution of polyamide containing methoxymethyl groups (Luckamide 5003, available from Dai Nippon Ink) in a 90:10 weight ratio solvent of methanol and n-propanol and 5 grams of N,N'-diphenyl-N,N'-bis(3-hydroxyphenyl)-[1,1-biphenyl]-4,4"-diamine and 5 grams of N-(3-hydroxyphenyl)-N-(4-methylphenyl)-N-phenylamine was mixed with 0.1 gram of oxalic acid. Also, an overcoat coating mixture of Example IV of the present invention consisting of 10 grams of a 10 percent by weight solution of polyamide containing methoxymethyl groups (Luckamide 5003, available from Dai Nippon Ink) in a 90:10 weight ratio solvent of methanol and n-propanol and 5 grams of N,N'-diphenyl-N,N'-bis(3-hydroxyphenyl)-[1,1-biphenyl]-4,4"-diamine and 5 grams of N-(hydroxyphenyl)-N-bis(4-methylphenyl)amine was mixed with 0.1 gram of oxalic acid. Samples of the three overcoat coating mixtures were stored at room temperature (~21° C.) in brown bottles under yellow room light. They were stirred with one inch magnetic stirrer at ~60 rpm to simulate the agitation employed for production solutions when the solutions are cycled between coating application and non-application phases. Samples were taken at regular intervals for viscosity at 1, 100 and 1000 sec$^{-1}$ for a curve fitted to HB(Hershel Bulkley) model and to obtain yield point. During the test period, the samples were examined visually for milky discoloration and any distinct change in viscosity, HB curve fit or yield point. A significant increase in the rate of change of any of these variables is considered the end of pot life. At a 20 weight percent solids solution required to dip coat a 3 to 5 micrometer thick overcoat, the pot life of the overcoat solution of the prior art (Example II) was only three or four days whereas the pot life at 20 weight percent solids solution of the present invention (Examples III and IV) was at least four weeks.

EXAMPLE VIII

Six electrophotographic imaging members were prepared by applying by dip coating a charge blocking layer onto the rough surface of eight aluminum drums having a diameter of 4 cm and a length of 31 cm. The blocking layer coating mixture was a solution of 8 weight percent polyamide (nylon 6) dissolved in 92 weight percent butanol, methanol and water solvent mixture. The butanol, methanol and water mixture percentages were 55, 36 and 9 percent by weight, respectively. The coating was applied at a coating bath withdrawal rate of 300 millimeters/minute. After drying in a forced air oven, the blocking layers had thicknesses of 1.5 micrometers. The dried blocking layers were coated with a charge generating layer containing 2.5 weight percent hydroxy gallium phthalocyanine pigment particles, 2.5 weight percent polyvinylbutyral film forming polymer and 95 weight percent cyclohexanone solvent. The coatings were applied at a coating bath withdrawal rate of 300 millimeters/minute. After drying in a forced air oven, the charge generating layers had thicknesses of 0.2 micrometers. The drums were subsequently coated with charge transport layers containing N,N'-diphenyl-N,N'-bis(3-methylphenyl)-1,1;-biphenyl-4,4'-diamine dispersed in polycarbonate (PCZ200, available from the Mitsubishi Chemical Company). The coating mixture consisted of 8 weight percent N,N'-diphenyl-N,N'-bis(3-methylphenyl)-1,1'-biphenyl-4,4;-diamine, 12 weight percent binder and 80 weight percent monochlorobenzene solvent. The coatings were applied in a Tsukiage dip coating apparatus. After drying in a forced air oven for 45 minutes at 118° C., the transport layers had thicknesses of 20 micrometers.

EXAMPLE IX

Two of the drums of Example VIII were overcoated with an overcoat layer containing a mixture of N,N'-diphenyl-N,N'-bis(3-hydroxyphenyl)-[1,1'-biphenyl]-4,4'-diamine (a hydroxy functionalized aromatic diamine), N-(3-hydroxy phenyl)-N-(4-methyl phenyl)-N-phenylamine (a hydroxy functionalized triarylamine) and Elvamide 8063, available from E.I. duPont de Nemours & Co.). 10 grams of a 10 percent weight solution of Elvamide 8063 in a 50:50 weight ratio solvent of methanol and propanol and 0.5 gram of N,N'-diphenyl-N,N'-bis(3-hydroxyphenyl)-[1,1'-biphenyl]-4,4'-diamine and 0.5 gram of N-(3-hydroxy phenyl)-N-(4-methyl phenyl)-N-phenylamine were roll milled for 2 hours and then allowed to stand for several hours before use. 0.1 gram of oxalic acid was then added to the mixture. 3 micrometer thick overcoats are applied in the dip coating apparatus with a pull rate of 190 millimeters/min. The overcoated drums were dried at 125° C. for 1 hour.

EXAMPLE X

Two of the drums of Example VIII were overcoated with an overcoat layer containing a mixture of N,N'-diphenyl-N,N'-bis(3-hydroxyphenyl)-[1,1'-biphenyl]-4,4'-diamine (a hydroxy functionalized aromatic diamine) and N-(3-hydroxy phenyl)-N-bis(4-methyl phenyl)-amine (a hydroxy functionalized triarylamine) and Elvamide 8063, available from E.I. duPont de Nemours & Co.). 10 grams of a 10 percent by weight solution of Elvamide 8063 in a 50:50 weight ratio solvent of methanol and propanol and 0.5 gram of N,N'-diphenyl-N,N'-bis(3-hydroxyphenyl)-[1,1'-biphenyl]-4,4'-diamine and 0.5 gram of N-(3-hydroxyphenyl)-N-bis(4-methyl phenyl)-amine were roll milled for 2 hours and then allowed to stand for several hours before use. 0.1 gram of oxalic acid was then added to the mixture. 3 micrometer thick overcoats are applied in the dip coating apparatus with a pull rate of 190 millimeters/min. The overcoated drums were dried at 125° C. for 1 hour.

EXAMPLE XI

The electrical properties of the photoconductive imaging samples prepared according to Examples VIII, IX and X were evaluated with a xerographic testing scanner. The drums were rotated at a constant surface speed of 5.66 cm per second. A direct current wire scorotron, narrow wavelength band exposure light, erase light, and four electrometer probes were mounted around the periphery of the mounted photoreceptor samples. The sample charging time was 177 milliseconds. The exposure light had an output wavelength of 775 to 785 nm and the erase light had an output wavelength of 680 to 720 nm. The relative locations of the probes and lights are indicated in Table A below:

TABLE A

| Element | Angle (Degrees) | Position (mm) | Distance From Photoreceptor |
|---|---|---|---|
| Charge | 0 | 0 | Screen at 2 mm |
| Probe 1 | 26 | 9.1 | |
| Expose | 45 | 15.7 | N.A. |
| Probe 2 | 68 | 23.7 | |
| Probe 3 | 133 | 46.4 | |
| Erase | 288 | 100.5 | N.A. |
| Probe 5 | 330 | 115.2 | |

The test samples were first rested in the dark for at least 60 minutes to ensure achievement of equilibrium with the testing conditions at 50 percent relative humidity and 72° F. Each sample was then negatively charged in the dark to a potential of about 385 volts. The charge acceptance of each sample and its residual potential after discharge by front erase exposure to 400 ergs/cm$^2$ were recorded. The test procedure was repeated to determine the photo induced discharge characteristics (PIDC) of each sample by different light energies of up to 40 ergs/cm$^2$. The 100 cycle electrical testing results obtained for the test samples of Examples VIII, IX and X show that the charge acceptance and dark decay were also measured in the scanner. A slight increase in sensitivity was observed in the overcoated devices. This increase corresponded to the 4–6 micrometer increase in thickness due to the overcoating. The residual potential was equivalent (15 volts) for all four devices and no cycle-up was observed when cycled for 100 cycles in a continuous mode. The overcoat clearly did not introduce any electrical deficiencies.

EXAMPLE XII

The three photoreceptors of Examples VIII, IX and X were print tested in a Xerox 4510 machine for 500 consecutive prints. There was no loss of image sharpness, no problem with background or any other defect resulting from the overcoats.

EXAMPLE XIII

The three drum photoreceptors of Examples VIII, IX and X were tested in a wear fixture that contained a bias charging roll for charging. Wear was calculated in terms of nanometers/kilocycles of rotation (nm/Kc). Reproducibility of calibration standards was about +−2 nm/Kc. The wear of the drum without the overcoat of example VIII was greater than 80 nm/Kc. Wear of the overcoated drums of the current invention of Examples IX and X was ~40 nm/Kc. Thus, the improvement in resistance to wear for the photoreceptor of this invention, when subjected to bias charging roll cycling conditions, was very significant.

EXAMPLE XIV

The three drum photoreceptors of Examples VIII, IX and X were contacted with gauze pads soaked with Isopar M, a $C_{15}$ branched hydrocarbon useful in liquid ink development xerography. When the pad which contacted the unovercoated photoreceptor of Example VII was exposed to an ultraviolet lamp, telltale fluorescence (characteristic of the diamine transport molecule) was observed on the pad whereas the pads which contacted the crosslinked overcoating of the photoreceptors of Examples IX and X showed no evidence of fluorescence, indicating that these crosslinked samples were resistant to Isopar extraction.

Although the invention has been described with reference to specific preferred embodiments, it is not intended to be limited thereto, rather those having ordinary skill in the art will recognize that variations and modifications may be made therein which are within the spirit of the invention and within the scope of the claims.

What is claimed is:

1. An electrophotographic imaging member comprising a supporting substrate coated with at least one photoconductive layer and an overcoating layer, the overcoating layer comprising a hydroxy functionalized aromatic diamine with a hydroxy functionalized triarylamine dissolved or molecularly dispersed in a crosslinked polyamide matrix, the hydroxy functionalized triarylamine being a compound different from the polyhydroxy functionalized aromatic diamine, the crosslinked polyamide prior to crosslinking being selected from the group consisting of materials represented by the following Formulae I and II:

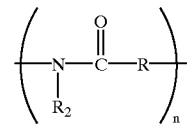

wherein:

n is a positive integer sufficient to achieve a weight average molecular weight between about 5000 and about 100,000, R is an alkylene unit containing from 1 to 10 carbon atoms, between 1 and 99 percent of the $R_2$ sites are —H, and the remainder of the $R_2$ sites are —$CH_2$—O—$CH_3$, and $$\left( R_1-N-\underset{R_3}{\overset{O}{C}}-R-\underset{R_4}{\overset{O}{C}}-N \right)_m \quad \text{II}$$

wherein:
  m is a positive integer sufficient to achieve a weight average molecular weight between about 5000 and about 100000,
  $R_1$ and R are independently selected from the group consisting of alkylene units containing from 1 to 10 carbon atoms, and
  between 1 and 99 percent of the $R_3$ and $R_4$ sites are —H, and
  the remainder of the $R_3$ and $R_4$ sites are —$CH_2$—O—$CH_3$;
  wherein the hydroxy functionalized triarylamine is represented by the following formula:

$$OH-Ar-\underset{Ar'}{N}-Ar''$$

wherein
  Ar is selected from the group consisting of:

[phenyl and R-substituted phenyl structures]

R is selected from the group consisting of —$CH_3$, —$C_2H_5$, —$C_3H_7$ and —$C_4H_9$,
  Ar' and Ar" are independently selected from the group consisting of:

[phenyl, R-phenyl, biphenyl, OH-phenyl, and OH/R-phenyl structures]

R is selected from the group consisting of —$CH_3$, —$C_2H_5$, —$C_3H_7$ and —$C_4H_9$,
  the hydroxy functionalized triarylamine compound being free of any direct conjugation between —OH groups and the nearest nitrogen atom through one or more aromatic rings.

2. An electrophotographic imaging member according to claim 1 wherein the polyamide is crosslinked in the presence of an oxalic acid catalyst.

3. An electrophotographic imaging member according to claim 1 wherein between about 40 percent and about 60 percent of the total number of the alkylene unit R in polyamide Formula I is selected from the group consisting of $(CH_2)_4$ and $(CH_2)_6$, and between about 40 percent and about 60 percent of the total number of the alkylene units $R_1$ and R in polyamide Formula II are independently selected from the group consisting of $(CH_2)_4$ and $(CH_2)_6$.

4. An electrophotographic imaging member according to claim 3 wherein the polyamide is represented by the formula:

$$\left[ \underset{O}{\overset{}{C}}-N-\underset{R_1}{\overset{H}{}}-\underset{O}{\overset{}{C}}-N-\underset{\underset{O-CH_3}{CH_2}}{\overset{R_2}{}}-\underset{O}{\overset{}{C}}-N-\underset{R_3}{\overset{H}{}}-\underset{O}{\overset{}{C}}-N-\underset{\underset{O-CH_3}{CH_2}}{\overset{R_2}{}}-\underset{O}{\overset{}{C}}-N-\underset{R_3}{\overset{H}{}} \right]_n$$

wherein:
  $R_1$, $R_2$, and $R_3$ are alkylene units independently selected from the group consisting of units containing from 1 to 10 carbon atoms, wherein between about 40 and about 60 percent of the total number of alkylene units are selected from the group consisting of $(CH_2)_4$ and $(CH_2)_6$, and n is a positive integer sufficient to achieve a weight average molecular weight between about 5000 and about 100,000.

5. An electrophotographic imaging member according to claim 1 wherein the hydroxy functionalized aromatic diamine is represented by the following formula:

$$OH-Ar-\underset{Ar'}{N}-[Z]-\underset{Ar'}{N}-Ar-OH$$

wherein:
  Z is selected from the group consisting of:

[fluorene, dimethyl-phenyl, and biphenyl-$(X)_n$ structures]

n is 0 or 1,
  Ar is selected from the group consisting of:

[R-phenyl, biphenyl, and dimethyl-phenyl structures]

R is selected from the group consisting of —$CH_3$, —$C_2H_5$, —$C_3H_7$, and —$C_4H_9$, Ar' is selected from the group consisting of:

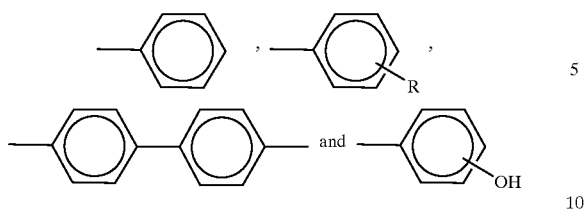

X is selected from the group consisting of:

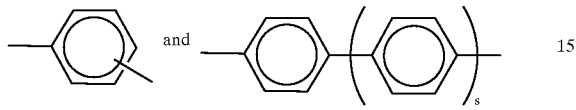

s is 0, 1 or 2,
the hydroxy functionalized aromatic diamine compound being free of any direct conjugation between —OH groups and the nearest nitrogen atom through one or more aromatic rings.

6. An electrophotographic imaging member according to claim 5 wherein the hydroxy functionalized aromatic diamine is N,N'-diphenyl-N,N'-bis(3-hydroxyphenyl)-[1,1-biphenyl]-4,4"-diamine represented by the following formula:

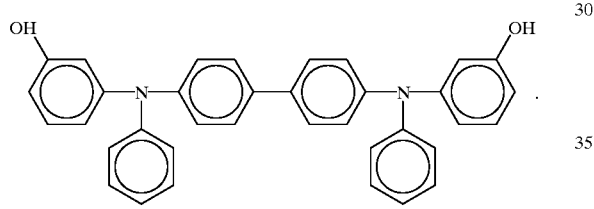

7. An electrophotographic imaging member according to claim 1 wherein the overcoating is substantially insoluble in any solvent in which it was soluble prior to crosslinking.

8. An electrophotographic imaging member according to claim 1 wherein the overcoating is insoluble in and non-absorbing in liquid ink vehicles.

9. An electrophotographic imaging member according to claim 1 wherein the overcoating is continuous and has a thickness less than about 10 micrometers.

10. An electrophotographic imaging member according to claim 1 wherein the overcoating has a thickness between about 1 micrometer and about 5 micrometers.

11. An electrophotographic imaging member according to claim 1 wherein the overcoating is hole transporting.

12. An electrophotographic imaging member according to claim 1 wherein the at least one photoconductive layer comprises a charge generating layer and a charge transport layer.

13. An electrophotographic imaging process comprising providing an electrophotographic imaging member comprising
a supporting substrate coated with at least
a charge generating layer,
a charge transport layer and
an overcoating layer, the overcoating layer comprising
a hydroxy functionalized aromatic diamine and
a hydroxy functionalized triarylamine dissolved or molecularly dispersed in
a crosslinked polyamide matrix, the crosslinked polyamide prior to crosslinking being selected from the group consisting of materials represented by the following Formulae I and II:

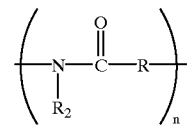

wherein:
n is a positive integer sufficient to achieve a weight average molecular weight between about 5000 and about 100,000,
R is an alkylene unit containing from to carbon atoms, between 1 and 99 percent of the $R_2$ sites are —H, and the remainder of the $R_2$ sites are —$CH_2$—O—$CH_3$, and

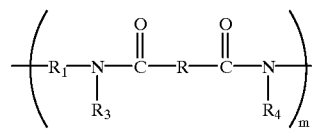

wherein:
m is a positive integer sufficient to achieve a weight average molecular weight between about 5000 and about 100000,
$R_1$ and R are independently selected from the group consisting of alkylene units containing from 1 to 10 carbon atoms, and
between 1 and 99 percent of the $R_3$ and $R_4$ sites are —H, and
the remainder of the $R_3$ and $R_4$ sites are —$CH_2$—O—$CH_3$,
wherein the hydroxy functionalized triarylamine is represented by the following formula:

wherein
Ar is selected from the group consisting of:

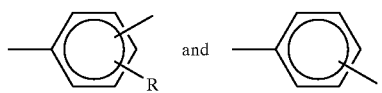

R is selected from the group consisting of —$CH_3$, —$C_2H_5$, —$C_3H_7$ and —$C_4H_9$,
Ar' and Ar" are independently selected from the group consisting of:

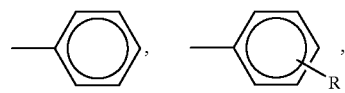

-continued

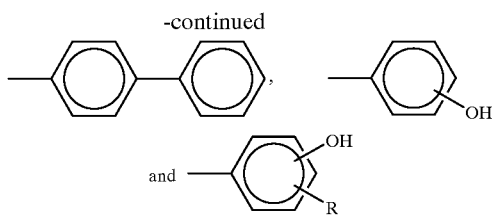

R is selected from the group consisting of —$CH_3$, —$C_2H_5$, —$C_3H_7$ and —$C_4H_9$, the hydroxy functionalized triarylamine compound being free of any direct conjugation between —OH groups and the nearest nitrogen atom through one or more aromatic rings, uniformly charging the imaging member, exposing the imaging member to activating radiation in image configuration to form an electrostatic latent image, developing the latent image with toner particles to form a toner image, and transferring the toner image to a receiving member.

14. An electrophotographic imaging process according to claim 13 including using a contacting bias charging roll to uniformly charge the imaging member.

15. An electrophotographic imaging process according to claim 13 including transferring the toner image to a receiving member with a bias transfer roll.

16. An electrophotographic imaging process according to claim 13 wherein the toner particles are supplied to the latent image in a liquid developer comprising the toner particles dispersed in a liquid carrier.

17. An electrophotographic imaging member comprising a supporting substrate coated with at least one photoconductive layer and an overcoating layer, the overcoating layer comprising a mixture comprising a hydroxy functionalized aromatic diamine with a hydroxy functionalized triarylamine dissolved or molecularly dispersed in a partially crosslinked polyamide matrix, wherein the overcoating is substantially insoluble in any solvent in which it was soluble prior to crosslinking, the hydroxy functionalized aromatic diamine being a compound different from the polyhydroxy functionalized triarylamine, the partially crosslinked polyamide prior to crosslinking comprising a crosslinkable polyamide selected from the group consisting of materials represented by the following Formulae I and II:

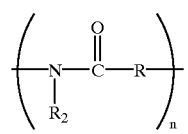

I wherein:

n is a positive integer sufficient to achieve a weight average molecular weight between about 5000 and about 100,000, R is an alkylene unit containing from 1 to 10 carbon atoms, between 1 and 99 percent of the $R_2$ sites are —H, and the remainder of the $R_2$ sites are —$CH_2$—O—$CH_3$, and

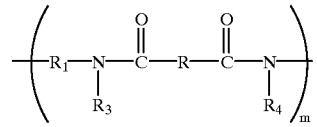

II wherein:

m is a positive integer sufficient to achieve a weight average molecular weight between about 5000 and about 100,000, $R_1$ and R are independently selected from the group consisting of alkylene units containing from 1 to 10 carbon atoms, and between 1 and 99 percent of the $R_3$ and $R_4$ sites are —H, and the remainder of the $R_3$ and $R_4$ sites are —$CH_2$—O—$CH_3$;

wherein the hydroxy functionalized triarylamine is represented by the following formula:

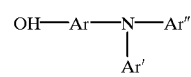

wherein

Ar is selected from the group consisting of:

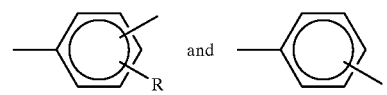

R is selected from the group consisting of —$CH_3$, —$C_2H_5$, —$C_3H_7$ and —$C_4H_9$, Ar' and Ar" are independently selected from the group consisting of:

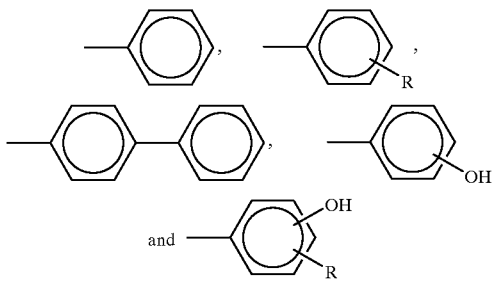

R is selected from the group consisting of —$CH_3$, —$C_2H_5$, —$C_3H_7$ and —$C_4H_9$, the hydroxy functionalized triarylamine compound being free of any direct conjugation between —OH groups and the nearest nitrogen atom through one or more aromatic rings.

18. An electrophotographic imaging member comprising a supporting substrate coated with at least one photoconductive layer and an overcoating layer, the overcoating layer comprising a hydroxy functionalized aromatic diamine with a hydroxy functionalized triarylamine dissolved or molecularly dispersed in a crosslinked polyamide matrix, the hydroxy functionalized triarylamine being a compound different from the polyhydroxy functionalized aromatic diamine, the crosslinked polyamide prior to crosslinking being selected from the group consisting of materials represented by the following Formulae I and II:

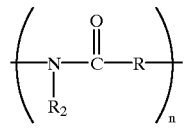
I wherein:
- n is a positive integer sufficient to achieve a weight average molecular weight between about 5000 and about 100,000,
- R is an alkylene unit containing from 1 to 10 carbon atoms,
- between 1 and 99 percent of the $R_2$ sites are —H, and
- the remainder of the $R_2$ sites are —$CH_2$—O—$CH_3$, and

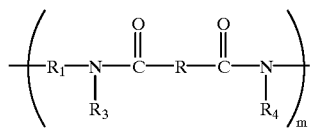
II wherein:
- m is a positive integer sufficient to achieve a weight average molecular weight between about 5000 and about 100000,
- $R_1$ and R are independently selected from the group consisting of alkylene units containing from 1 to 10 carbon atoms, and
- between 1 and 99 percent of the $R_3$ and $R_4$ sites are —H, and
- the remainder of the $R_3$ and $R_4$ sites are —$CH_2$—O—$CH_3$, the hydroxy functionalized triarylamine being selected from the group consisting of N-(3-hydroxyphenyl)-N-(4-methylphenyl)-N-phenylamine and N-(3-hydroxyphenyl)-N-bis(4-methylphenyl)amine represented, respectively, by the formulae:

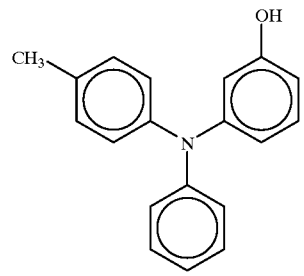

and

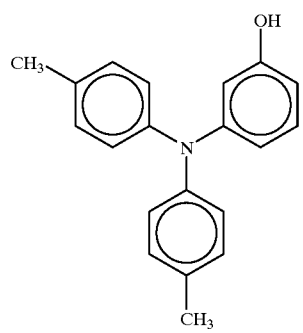

* * * * *